United States Patent
Stimson et al.

(10) Patent No.: US 6,478,252 B1
(45) Date of Patent: Nov. 12, 2002

(54) AIRCRAFT BRAKING SYSTEMS

(75) Inventors: Ian Leonard Stimson, Rugby; Richard John Miller; Graham Carrier, both of Coventry, all of (GB)

(73) Assignee: Dunlop Ltd., London (GB)

( * ) Notice: Subject to any disclaimer, the term of this patent is extended or adjusted under 35 U.S.C. 154(b) by 0 days.

(21) Appl. No.: 07/696,750

(22) Filed: May 7, 1991

Related U.S. Application Data

(62) Division of application No. 07/307,633, filed on Feb. 8, 1989.

(30) Foreign Application Priority Data

| Feb. 16, 1988 | (GB) | ................................................ 8803544 |
| Aug. 5, 1988 | (GB) | ................................................ 8818673 |

(51) Int. Cl.$^7$ .............................................. B64C 25/42
(52) U.S. Cl. ..................... 244/111; 188/16; 188/264 R; 303/93
(58) Field of Search ....................... 246/111; 188/264 R, 188/18 R, 16, 79, 71.1, 354, 382, 85, 116 R; 303/93, 9.61, 92

(56) References Cited

U.S. PATENT DOCUMENTS

| 3,537,531 | A | * | 11/1970 | Serra ........................ 188/264 R |
| 3,797,612 | A | * | 3/1974 | Carias |
| 3,948,569 | A | * | 4/1976 | Gentet et al. ................ 244/111 |
| 3,993,174 | A | * | 11/1976 | Williams et al. ............. 188/344 |
| 4,008,868 | A | * | 2/1977 | Berg ............................ 244/111 |
| 4,591,213 | A | * | 5/1986 | Rapoport ...................... 303/93 |
| 4,646,242 | A | * | 2/1987 | Valaas ......................... 244/111 |

FOREIGN PATENT DOCUMENTS

| FR | 2106667 | * | 5/1972 |
| FR | 2145408 | * | 2/1973 |

* cited by examiner

Primary Examiner—Galen L. Barefoot
(74) Attorney, Agent, or Firm—Lorusso & Loud

(57) ABSTRACT

An aircraft braking system for a main undercarriage or undercarriages incorporates at least two brakes, which may be carbon type brakes, and a control unit for selectively disabling at least one brake during taxiing only, the control unit being arranged to ensure that the disabling of the brake or brakes does not affect the directional stability of the aircraft when the braking system is operated.

4 Claims, 1 Drawing Sheet

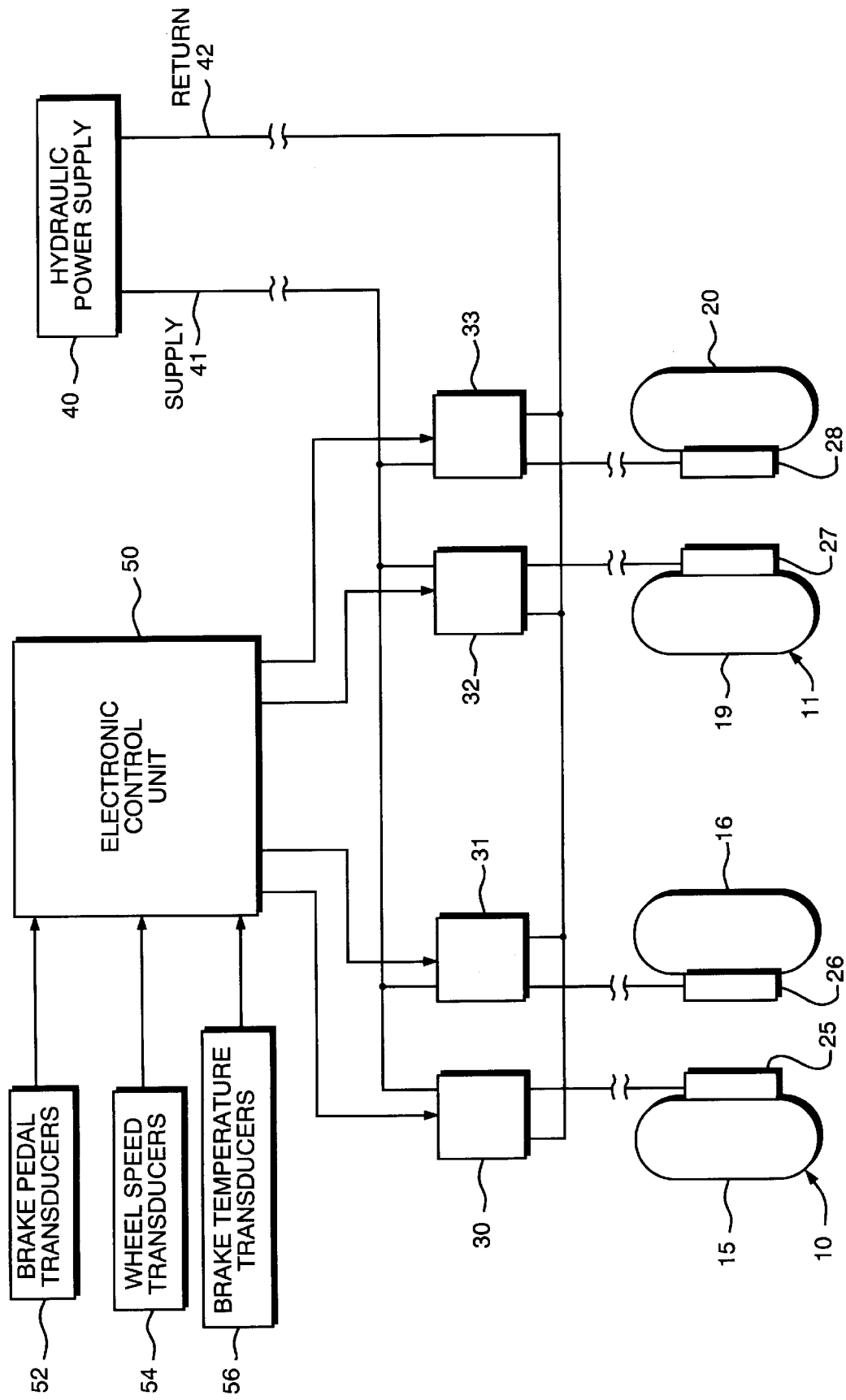

AIRCRAFT BRAKING SYSTEMS

This is a Divisional of application Ser. No. 07/307,633 filed Feb. 8, 1989.

This invention relates to aircraft braking systems, and particularly to braking systems for aircraft having two or more friction brakes.

An aircraft brake may comprise a stack of discs slidably mounted on a non-rotating torque tube surrounding a wheel axle and mounted within a landing wheel rim. Alternate (rotor) discs are drivable by the wheel rim and the remaining (stator) discs are keyed to the torque tube. Axially directed thrust is applied by an hydraulic system to squeeze the rotor and stator discs together to apply the brake.

In advanced brake systems of this kind the discs may be of carbon, normally a carbon-carbon composite in which carbon fibres are embedded in a dense carbon matrix. Manufacture of such discs is very expensive, and it is therefore highly desirable to minimize the rate of wear of the discs in service so as to reduce the frequency of disc replacement and the average cost per landing.

According to the present invention, an aircraft braking system comprising a plurality of brakes comprises means for selectively disabling at least one of said brakes for taxiing only, said means being arranged to ensure that the disabling of the brakes does not affect the directional stability of the aircraft when the braking system is operated.

Preferably in an aircraft braking system in accordance with the invention and comprising at least two brakes associated with wheels on each side of an aircraft, means is provided for disabling at least one of said brakes on each side of the aircraft during taxiing.

In a braking system comprising braked wheels on the center line of the aircraft it would be possible to disable the brakes of one or more of such wheels without affecting the directional stability of the aircraft during braking.

The invention is based on the discovery that the rate of wear of a carbon brake is dependent to a major extent on the number of braking operations effected, even though a considerable number of such operations during taxiing may dissipate relatively little energy compared with that dissipated during a landing run. By providing, in accordance with the invention, means for disabling certain brakes of the undercarriage during taxiing it is possible greatly to extend the wear life of the brakes on the aircraft.

By the above means those brakes disabled during taxiing will have a much extended life as determined by the amount of wearable material provided in the brake design and indicated by the brake wear pin detector compared with those brakes not disabled during taxiing. Means may be provided to disable different brakes selectively during a series of braking applications during taxiing so as to provide reasonably even wear on all of the brakes and thereby to make it possible to extend the disc replacement intervals for the whole of the braking system. Alternatively to extending the life of a brake by disabling it during taxiing the design may make use of this reduction in wear by reducing the amount of wearable material provided and hence reduce the weight of that brake.

In either kind of application as described in the preceding paragraph, braking during the taxiing operation is preferably under the control of an automatically-controlled system which does not require intervention by the pilot of the aircraft. Control of such a system may, for instance, be determined primarily by the wheel speed, the system being operative to disable certain brakes when the wheel speed is below a certain threshold level and above a certain minimum (to retain full braking when the aircraft is at rest). However, to avoid additional brake operation as the aircraft is about to come to rest the disabling of brakes may, preferably, be arranged to continue at speeds down to and including standstill: in this latter case manual or automatic override may be provided to enable the aircraft to be held at rest against full engine thrust. Means may be provided to respond to brake temperatures and the algorithms for determining which brakes should be disabled for taxiing may take into account the temperatures of each brake to ensure that, within limits set by other considerations, i) the temperatures of brakes are reasonably uniform across the aircraft, or ii) certain brakes are deliberately allowed to achieve an increased temperature (in order to take advantage of an enhanced temperature—dependent friction characteristic of the brake material), or iii) the disabled brakes are brought into operation if the temperature of one or more of the remaining brakes exceeds a predetermined level.

Alternatively the system may take into account the variation in wear between all brakes across the aircraft in order to optimize the safety and maintenance procedures for these brakes.

Preferably an over-ride capability is provided, that if a predetermined input level at the pilot's brake pedal is exceeded all the brakes are applied as in a normal brake operating system. During the landing run, it will generally be desirable for the disabling system to be inoperative, i.e. for full braking to be provided throughout the run including any period when the wheel speed falls below the threshold level mentioned above. This may be achieved by, for example a time delay actuated by a 'weight switch' which responds to the aircraft weight being imposed on the landing gear when the aircraft touches down.

One embodiment of the invention will now be described, by way of example, with reference to the accompanying drawing, which is a block schematic illustration of an aircraft braking system in accordance with the invention.

For simplicity, a system employing only two main landing gears 10, 11, each with two wheels 15, 16; 19, 20 respectively is shown. The landing gear 10 is mounted on the left hand side of an aircraft and the landing gear 11 on the right hand side. The brakes, which have carbon discs, are actuated by conventional hydraulic means 25, 26, 27, 28 via electrohydraulic valves 30, 31, 32, 33 which are supplied with hydraulic power from a supply unit 40 through a supply line 41, a return line 42 being provided in conventional manner. The supply and return lines 40, 41, and connecting lines between the valves and the brakes are shown broken to indicate the provision of various conventional system components such as hydraulic fuses which are provided but which do not require description in the present context.

Individual control of each of the electrohydraulic valves 30–33 is provided by an electronic control unit 50. This receives input from the pilot's brake pedal transducers 52, wheel speed transducers 54 and brake temperature sensors 56.

The electronic control unit 50 is arranged so that if the wheel speed is between a predetermined low level (to enable all the brakes to operate when the aircraft is stationary) and a predetermined higher level, the brakes of either the two outboard wheels 15 and 20 or the two inboard wheels 16 and 19 are disabled.

Algorithms governing the operation of the unit 50 also include requirements for the brake temperature, aircraft weight switch and other input signals from conventional sensors which may be provided. Essentially, however, the system is designed to disable the selected brakes during taxiing.

A further function of the electronic control unit 50 is to apply the disabling condition to a different pair of brakes following each brake operation during a given taxiing period. Thus the inboard brakes 16 and 19 may be disabled and the outboard brakes 15 and 20 operative during the first brake application. The system will then change to disabling the brakes 15 and 20 and rendering operative the brakes 16 and 19 on the next brake application, and so on.

By the means described above, the number of brake applications for each individual brake during taxiing will be halved. For installations having greater numbers of brakes different ratios of use non-use of individual brakes may be chosen.

The invention is equally applicable to braking systems in which the brakes are actuated electrically rather than hydraulically.

While in the embodiment described above the control of the braking system is primarily dependent on wheel speed, use may be made of other parameters to identify to the control unit the phase of flight the aircraft is entering or has already entered, (i.e. taxiing out, take-off, in flight, landing, taxiing-in or stationary on the ground).

In aircraft braking systems there are usually more than the one system described in the embodiment above. These multiple systems may operate as individual systems where not all the systems are operating at any moment of time or they may act in unison, each contributing to the overall deceleration of the aircraft. In order to achieve the objectives of this invention the systems can be designed such that rather than disabling brakes during taxi a reduced number of brakes are actuated during taxi as a result of suitable selection of operating systems.

The facility to change from one pair or group of brakes to another pair or group of brakes for taxi purposes could be achieved by changing from one braking system to another braking system if each system were designed to operate all brakes for landing and take off but only a restricted group of brakes for taxi, the restricted group of brakes being different for the two systems.

While in the embodiment described above the system is arranged to apply the disabling condition to a different pair of brakes following each brake operation during a given taxiing period in order to provide reasonably even wear on all of the brakes a braking system in accordance with the invention may alternatively be arranged always to disable the same brakes during typical taxiing. This will provide a very greatly extended wear life, but only for those brakes which are disabled during taxiing. In terms of cost, however, such a system has a distinct advantage in that the control unit can be simplified.

One method of control for the variant described in the preceding paragraph may be to provide means for responding to the brake pressure selected by the pilot, so that if a pressure under, say, half the maximum pressure is selected (as is usual during taxiing) some brakes are disabled. but if a pressure above that threshold is selected all the brakes are operated. This control system can be provided with less complexity and cost.

In a further alternative system in accordance with the invention, advantage may be taken of the substantially lower rate of wear of a carbon brake at higher temperatures than at lower temperatures thus for a given number of brake applications (of similar energy input) a brake will wear at a substantially lower rate during taxiing after landing, when the brakes are hot, than during taxiing before take-off, when the brakes in most cases are relatively cold. There is therefore an option to arrange the system to disable certain brakes during a taxi-out while retaining those brakes in operation during a taxi-in.

The importance of the saving in brake wear achieved by the invention may be appreciated if one takes into account the fact that an aircraft makes many brake applications during taxiing, before take-off and after landing, and that the consequential brake wear of a carbon brake is very significant.

The system in accordance with the invention has at further advantage in that the disabling of some brakes during taxiing provides the system with improved 'feel' for the pilot, who is enabled to apply a more gentle retardation than is the case with conventional systems in which all the brakes operate during taxiing.

We claim:

1. A method of increasing the service life of carbon disks which form the functional braking elements of a brake disk stack of an aircraft brake assembly, each brake assembly associated with a respective wheel of a plurality of wheels which comprises a landing gear configuration of the aircraft, the method comprising the steps of:

establishing a preselect first group of brake assemblies of a total number of brake assemblies which are actuated for both low-pressure and high pressure braking of the aircraft;

establishing a preselect second group of brake assemblies which comprises the remaining number of the total number of brake assemblies which are actuated only during high-pressure braking of the aircraft;

actuating the first group of brake assemblies during the taxi-snub stops of the aircraft when it is on the ground; and actuating the first and second groups of brake assemblies during landing of the aircraft.

2. A method of increasing the service life of carbon disks which form the functional braking elements of a brake disk stack of an aircraft brake assembly, each brake assembly associated with a respective wheel of a plurality of wheels comprising a landing gear configuration of the aircraft, the method comprising a the steps of:

proving a programmable brake controller which operates in conjunction with a pilot's control for braking of the aircraft;

installing switch means within the circuitry of each brake assembly, the switch means being interconnected through the brake controller to actuate each of said respective brake assemblies; and programming the brake controller to select various of the brake assemblies for braking action in accordance with a particular sequence such that all of the brake assemblies are actuated during an aircraft landing operation and only a preselected group of the total of brake assemblies is actuated during taxi braking operations of the aircraft when it is on the ground.

3. A method of minimizing the rate of wear of carbon discs in a stack of discs in an aircraft brake assembly comprising the steps of:

associating each aircraft brake assembly with a corresponding wheel of the aircraft;

establishing a landing gear configuration comprising at least two wheels each including an aircraft brake assembly arranged on each side of the center line of the aircraft;

applying an operative braking condition to all the brake assemblies during landing of the aircraft;

applying an operative braking signal to less than all the brake assemblies during taxiing of the aircraft.

4. A method of minimizing the rate of wear of carbon discs of a stack of discs of an aircraft brake assembly, each brake assembly associated with a respective wheel of a plurality of wheels which comprise a landing gear configuration of the aircraft, the method comprising the steps of:

establishing as an undercarriage at least two wheels on each side of the aircraft and a preselected first group of brake assemblies associated with each wheel;

establishing a preselected second group of brake assemblies which is at least one, but less than all, of the brake assemblies associated with the wheels on each side of the aircraft;

disabling all the brake assemblies save the second preselected group of brake assemblies during taxiing.

* * * * *